US012601624B2

(12) United States Patent
Schunk

(10) Patent No.: US 12,601,624 B2
(45) Date of Patent: Apr. 14, 2026

(54) NO EMISSION TANK GAUGE

(71) Applicant: Jeff Ray Schunk, Mason, MI (US)

(72) Inventor: Jeff Ray Schunk, Mason, MI (US)

( * ) Notice: Subject to any disclaimer, the term of this patent is extended or adjusted under 35 U.S.C. 154(b) by 170 days.

(21) Appl. No.: 18/523,519

(22) Filed: Nov. 29, 2023

(65) Prior Publication Data

US 2024/0094038 A1 Mar. 21, 2024

Related U.S. Application Data

(63) Continuation-in-part of application No. 18/162,418, filed on Jan. 31, 2023, now Pat. No. 12,332,047.

(60) Provisional application No. 63/305,408, filed on Feb. 1, 2022.

(51) Int. Cl.
*G01F 23/00* (2022.01)
*G01N 1/12* (2006.01)

(52) U.S. Cl.
CPC ........... *G01F 23/0023* (2013.01); *G01N 1/12* (2013.01)

(58) Field of Classification Search
CPC ........ G01F 23/0023; G01N 1/12; G01N 1/14; G01N 1/16; G01N 1/24
USPC ......................... 73/321, 324, 864.83, 864.84
See application file for complete search history.

(56) References Cited

U.S. PATENT DOCUMENTS 2,006,301 A * 6/1935 Martinus ............. G01F 23/0023 73/864.31
2,009,117 A * 7/1935 Meley ................. G01F 23/0023 33/703
2,200,630 A * 5/1940 Mccabe .............. G01F 23/0023 33/717
2,265,736 A * 12/1941 Larson ................ G01F 23/0023 33/715
2,284,396 A * 5/1942 Pfeifer ...................... G01N 1/12 251/212
2,637,111 A * 5/1953 Mcduff ............... G01F 23/0023 33/720
2,869,239 A * 1/1959 Jurs ..................... G01F 23/0023 33/715
2,904,998 A * 9/1959 Jurs ......................... G01F 23/42 73/321
3,500,546 A * 3/1970 Pilcher ................ G01F 23/0023 73/321
3,838,518 A * 10/1974 Hendrickson ....... G01F 23/0023 324/171

(Continued)

FOREIGN PATENT DOCUMENTS

WO WO-9303339 A1 * 2/1993 ............. G01F 23/00

*Primary Examiner* — John Fitzgerald
(74) *Attorney, Agent, or Firm* — Young Basile Hanlon & MacFarlane, P.C.

(57) ABSTRACT

A no emission tank gauge has a housing having a valve connection extending from a bottom side of the housing, a gauge line within the housing, the gauge line having a plumb bob attached at a free end, a pulley attached within the housing and supporting the gauge line, the pulley configured to allow extension and retraction of the gauge line, and an actuator connected to the pulley and extending exterior to the housing and configured to actuate the extension and retraction of the gauge line via rotation of the pulley. The housing has a window in a wall of the housing facing a marked side of the gauge line. The valve connection has an opening sized to allow for passage of the plumb bob and the gauge line. The housing is sealed when the valve connection is connected to a valve to prevent escape of fluid.

14 Claims, 17 Drawing Sheets

(56) References Cited

U.S. PATENT DOCUMENTS 4,059,009 A * 11/1977 Ball ........................ G01N 30/22 73/864.83
4,094,187 A * 6/1978 Navarre, Jr. ....... G01N 33/0006 73/864.34
4,126,040 A * 11/1978 Varacins ............. G01F 23/0023 73/293
4,196,627 A * 4/1980 Locher ..................... G01N 1/14 73/864.31
4,226,023 A * 10/1980 Gravert ............... G01F 23/0023 33/720
4,255,859 A * 3/1981 Klieman ............. G01F 23/0023 73/321
4,262,854 A * 4/1981 Jett ........................ B65H 75/38 242/584.1
4,318,227 A * 3/1982 Gravert ............... G01F 23/0023 33/720
4,345,466 A * 8/1982 Lesser ................. G01F 23/0023 73/863.82
4,875,295 A * 10/1989 Fleckenstein ....... G01F 23/0023 33/720
5,144,836 A * 9/1992 Webb ...................... G01F 23/42 73/321
5,408,889 A * 4/1995 Parault ..................... G01N 1/12 73/864.34
5,408,890 A * 4/1995 Klaus ....................... G01N 1/12 73/863.81
5,691,488 A * 11/1997 Giannone ................ G01N 1/12 73/864.31
6,094,998 A * 8/2000 Giannone ................ G01N 1/12 73/863.86
6,360,620 B1 * 3/2002 Jensen ..................... G01N 1/12 166/264
7,455,257 B1 * 11/2008 Kaleta ..................... B63C 11/02 242/397.3
8,888,033 B2 * 11/2014 Hiebenthal .......... B65H 75/486 242/375
12,332,047 B2 * 6/2025 Schunk ................... F17C 13/04
2008/0092634 A1 * 4/2008 Bourassa ................ G01M 3/04 73/49.2
2010/0241369 A1 * 9/2010 Wicht ................. G01F 23/0038 73/290 R
2014/0070041 A1 * 3/2014 Hiebenthal ........ B65H 75/4452 242/375
2017/0038239 A1 * 2/2017 Kofford .................. G01F 23/04

* cited by examiner

NO EMISSION TANK GAUGE

CROSS-REFERENCE TO RELATED APPLICATION

This application is a continuation in part of U.S. application Ser. No. 18/162,418, filed on Jan. 31, 2023, now U.S. Pat. No. 12,332,047, issued Jun. 17, 2025, which claims priority to U.S. Provisional Patent Application Ser. No. 63/305,408, filed Feb. 1, 2022, the entire disclosure of which is hereby incorporated by reference.

TECHNICAL FIELD

This disclosure relates to a tank gauge and tank gauge system that allows for the gauging of tank levels while eliminating emissions to the atmosphere during gauging.

BACKGROUND

Storage tanks used to store industrial oils and other fluids (e.g., liquids and gasses) must be properly sealed to prevent leakage of vapors contained within the tanks. The fluids can contain volatile compounds such as hydro carbons or other contaminants which, if released, can harm the environment or persons handling the tanks. Companies can face government penalties if their storage tanks are not sufficiently vapor tight. For example, the EPA conducts leakage tests on industrial storage tanks using sophisticated infrared cameras and has the authority to levy steep penalties—even for minimal leakage that would be imperceptible without the use of such equipment.

To check the level of liquid in a tank, some tanks have electronic or external gauging. However, the majority do not have such gauging. The conventional method to gauge a tank level is to open a tank hatch and stick a gauge through the hatch until it reaches the tank bottom. The gauge is withdrawn and the level read off of the marked gauge stick. Every time a tank level is measured this way, vapor emissions are released unabated to the atmosphere through the open hatch. When gauging storage tanks, workers are exposed to high concentrations of gas vapors during the process.

SUMMARY

Disclosed herein are implementations of tank gauges and tank gauging systems configured to allow measurement of a storage tank's liquid level while severely reducing or eliminating emissions from the storage tank during gauging.

In one implementation, a no emission tank gauge system has a housing having a valve connection extending from a bottom side of the housing, a gauge line within the housing, the gauge line having a plumb bob attached at a free end, a pulley attached within the housing and supporting the gauge line, the pulley configured to allow extension and retraction of the gauge line, and an actuator connected to the pulley and extending exterior to the housing and configured to actuate the extension and retraction of the gauge line via rotation of the pulley. The housing has a window in a wall of the housing facing a marked side of the gauge line. The valve connection has an opening sized to allow for passage of the plumb bob and the gauge line. The housing is sealed when the valve connection is connected to a valve to prevent escape of fluid.

Another implementation disclosed herein is of a low emission tank gauge comprising a plug having a top surface, a slot formed in the top surface of the plug, and a gauge line extending through the slot and having a plumb bob attached at one end, wherein the slot is sized to just allow the gauge line to freely move through the slot. In some embodiments, the slot has a flat side wall and a toothed side wall.

An implementation of a storage tank gauge system comprises a storage tank, an isolation valve attached to a top of the storage tank and having a pipe nipple extending therefrom, a fitting on an end of the pipe nipple, and a low emission tank gauge. The low emission tank gauge comprises a plug having a top surface and an open bottom end, the plug configured to mate with the fitting, a slot formed in the top surface of the plug, and a gauge line having a plumb bob attached at one end, another end of the gauge line fed through the slot, wherein the slot is sized to just allow the gauge line to freely move through the slot.

An implementation of this disclosure provides a no emission tank gauge that includes a housing that connects with an upper surface of a storage tank at a valve connection. The no emission tank gauge includes a pulley system disposed within the housing that includes a gauge line, a plumb bob connected with a distal end of the gauge line, and a sampling tube connected with the gauge line and configured to move with the gauge line as the plumb bob is lowered into the storage tank. The no emission tank gauge that includes a sampling device that removes a fluid sample from the storage tank through the sampling tube.

In some configurations, the sampling device may be enclosed by the housing. The sampling device may be connected with the gauge line at a position proximate to the plumb bob so that the sampling device moves with the plump bob. The sampling device may be positioned outside of the housing and is connected with the storage tank through the sampling tube. The sample device may include a blower and/or a pump and an analytical instrument connected with the blower and/or the pump and connected with the storage tank through the sampling tube, the analytical device configured to analyze a fluid sample. The no emission tank gauge may include a transparent window defined within a wall of the housing so that the gauge line is readable through the window. The gauge line and the sampling tube may be positioned on a single pulley. The gauge line and the sampling tube may be positioned on respective first and second pulleys. The first pulley may include an actuator configured to move the gauge line into the storage tank, and the second pulley may be spring loaded so that the sample tube remains taut as the actuator rotates the first pulley and simultaneously moves the gauge line and the sampling tube into the storage tank.

Another implementation of this disclosure describes a no emission tank gauge that includes a housing that is sealed and includes a valve connection that is connected with a storage tank. The no emission tank gauge includes a first pulley includes a gauge line and a plumb bob connected with the gauge line at a distal end of the gauge line, and the plumb bob is be lowered into the storage tank through the connection valve. A second pulley includes a sampling tube that is spooled around the second pulley and connected with the distal end of the gauge line or the plumb bob. The no emission tank gauge includes a third pulley that has a sampling device connected with a distal end of the sampling tube and a wire spooled around the third pulley, wherein the wire connects the sampling device and a power source.

In some implementations, the second and third pulleys may be spring loaded so that the wire and the sampling tube are taut with the gauge line as the plumb bob moves through the storage tank. The sampling tube may be connected with an analytical device configured to analyze fluid samples with the storage tank. The no emission tank gauge may include a recycle tube connected with the analytical device or the sample tube and configured to flush fluids from the sample tube and into the storage tank. The no emission tank gauge may include a window defined on a wall of the housing so that the gauge line is viewable within the housing. The gauge line may include a marked side that is visible outside of the housing through the window. The housing may include a first chamber that encloses the first pulley, a second chamber that encloses the second and third pulleys, and a channel that connects the first and second chambers.

Another implementation of the current disclosure includes a no emission tank gauge including a housing having a valve connection that extends from a bottom side of the housing and is configured to connect with a storage tank and a pulley assembly disposed within the housing. The pully assembly includes a gauge line comprising a plumb bob configured to be lowered into the storage tank and a sampling tube connected with a distal end of the gauge line and/or a portion of the plumb bob. The pulley assembly includes an actuator that moves the plumb bob into and out of the storage tank by unwinding the gauge line from the housing and a sampling device connected with and that moves fluids through the sampling tube. The no emission tank gauge includes an analytical device connected with the sampling tube and that analyzes a fluid sample pulled from the storage tank and through sampling tube.

In some configurations, the sampling tube may extend through a wall of the housing to the analytical device. The sampling device may include a recycle tube that moves fluids from the sampling tube to an inside of the storage tank. The sampling device may include a blower and/or a pump.

By having a plumb bob and gauge line in combination with a sampling tube configuration, a user can check the fluid levels of the storage tank (by observing measurements on the gauge line) and simultaneously or separately check the contents and concentrations of compounds within the storage tank by taking a sample. This solution provides an effective technique to monitor storage tanks without having to open the storage tank and risk external contamination or unintentional discharge of fluids or volatiles.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The low emission tank gauge and system disclosed herein allow for fuel levels in storage tanks to be obtained while minimizing emissions from the storage tank to atmosphere.

Figure 1:
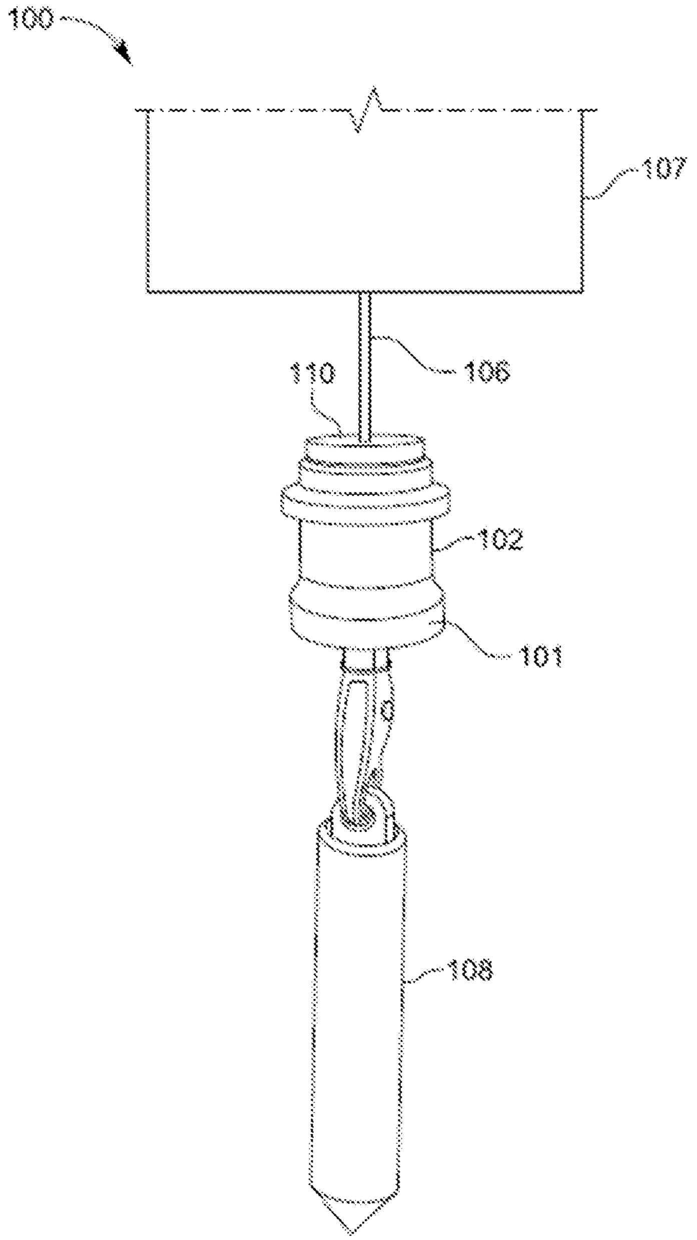
FIG. 1 is a schematic of a low emission tank gauge.
Figure 2:
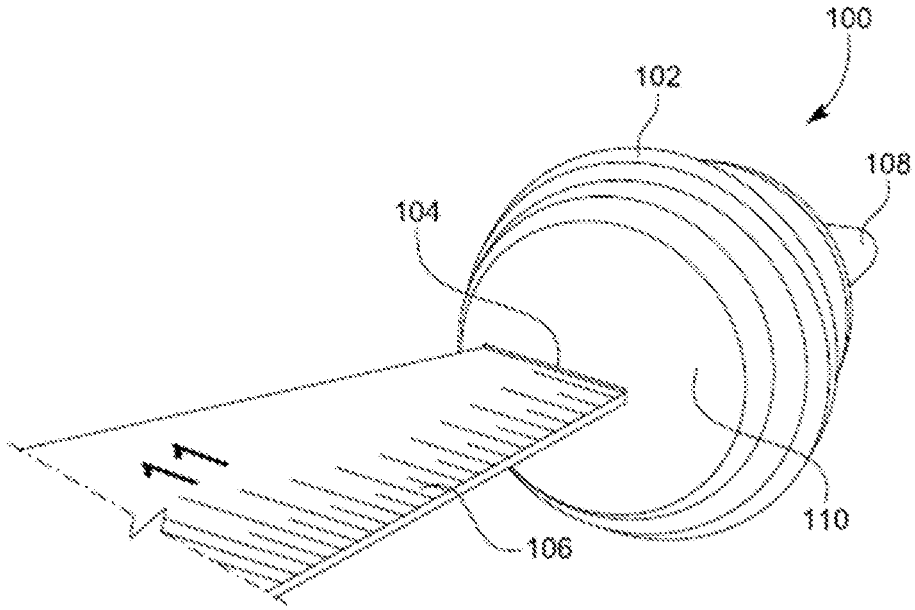
FIG. 2 is another view of the low emission tank gauge.

The low emission tank gauge 100 illustrated in FIGS. 1 and 2 comprises a plug 102 with a slot 104 through which a gauge line 106 or gauge tape passes through. The gauge line 106 is similar to a tape measure and can be housed in a housing 107 having a handle that can be used to unwind and rewind the gauge line 106. A plumb bob 108 is attached to the end of the gauge line 106 to provide weight to the gauge line 106 so that it pulls the gauge line 106 to the bottom of the tank. The gauge line 106 has measurements on at least one side. The slot 104 is formed in the top 110 of the plug 102 and is sized just slightly wider and deeper than the gauge line 106 so that the gauge line 106 freely moves within the slot 104 but very little vapor escapes through the slot 104. As a non-limiting example, the gauge line 106 thickness may be about 1/100 of an inch and the slot 104 with be slightly deeper than that, such as 1/5/100 of an inch. The width of the slot 104 may be about 2/100 of an inch wider than the gauge line 106.

Figure 3:
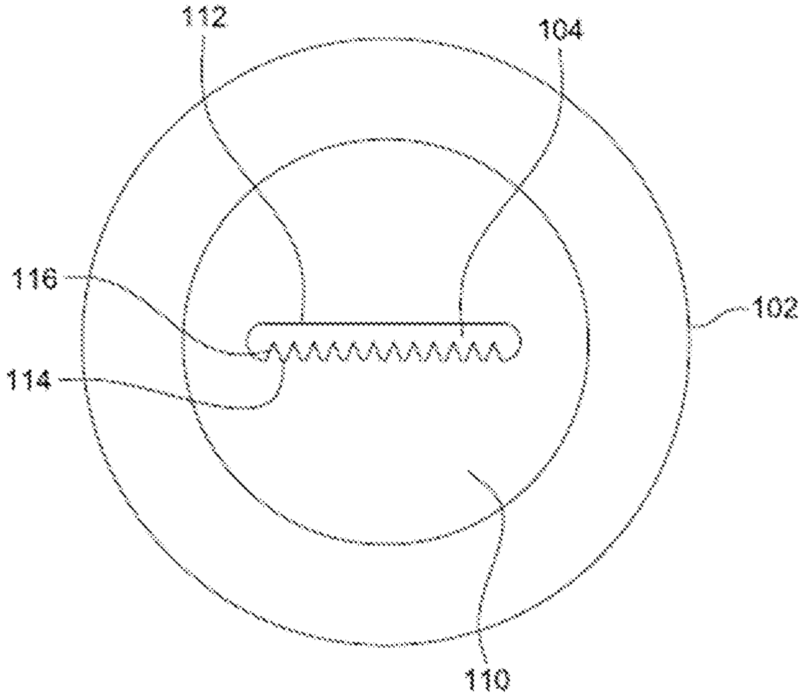
FIG. 3 is a plan view of the top of the plug illustrating an aspect of the slot.

In some embodiments, shown in FIG. 3, the slot 104 has a flat side wall 112 and a toothed side wall 114. The flat side wall 112 is configured to remove a majority of the liquid from the gauge line 106 as it is being pulled out of the tank. Accordingly, if measurements are on only one side of the gauge line 106, the measurements should be facing the toothed side wall 114 of the slot 104. The toothed side wall 114 is jagged, or has teeth 116 or a similar configuration that are configured to contact the gauge line 106 when it is being pulled through the slot 104, removing a portion of the liquid but leaving liquid where the teeth 116 do not contact the gauge line 106 so that the level can be read. This allows for the least liquid and vapor being removed from the tank during the measurement process.

Figure 4:
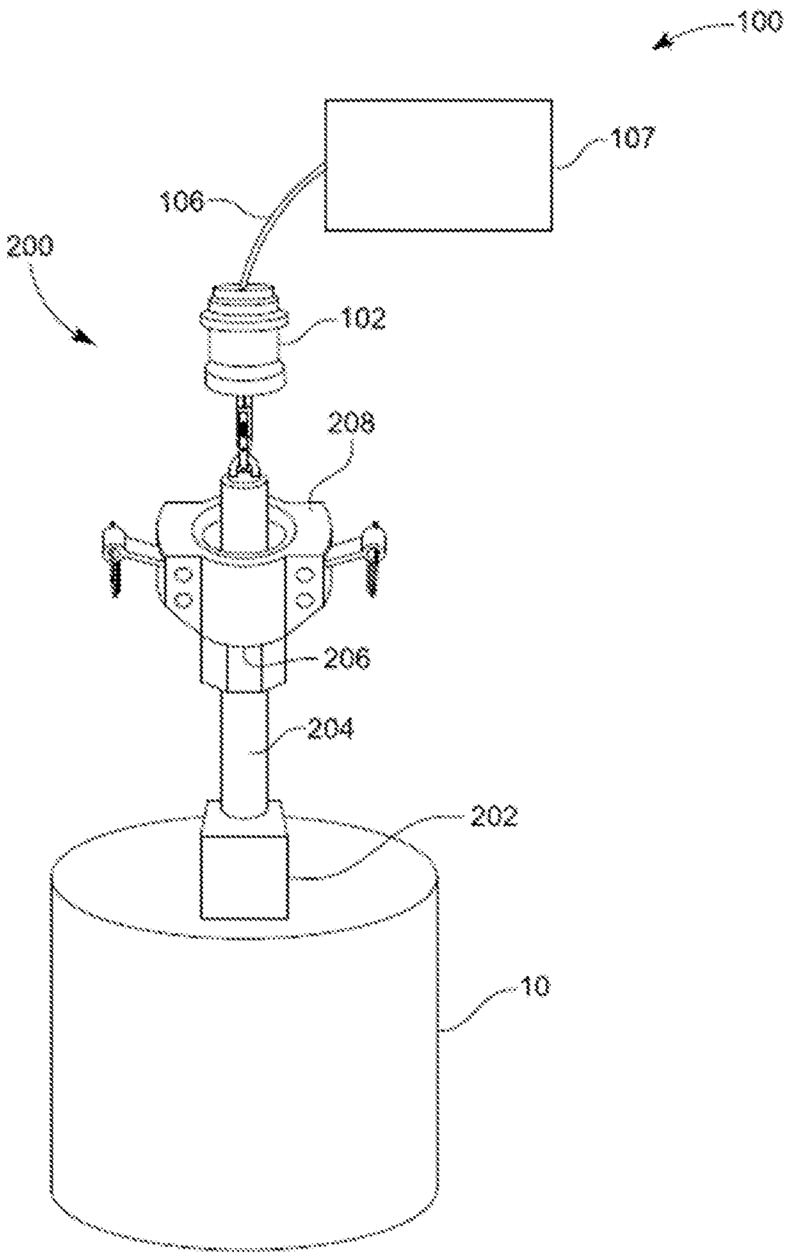
FIG. 4 is a schematic of a low emission tank gauge system.

The low emission tank gauge system 200 includes the low emission tank gauge 100 as well as an isolation valve 202 on the roof of the storage tank 10. See FIG. 4. The isolation valve 202 is connected to the tank roof. An existing isolation valve can be used, or a new isolation valve can be added to the top of the storage tank 10. From the isolation valve 202 extends a pipe nipple 204. The pipe nipple 204 can be of any length so long as it is long enough to accommodate the plumb bob 108. As a non-limiting example, a pipe nipple 204 of at least 10-12" in length or longer can be used. The isolation valve 202 and pipe nipple 204 should be of such a diameter that plumb bob 108 can pass through. As a non-limiting example, a 4" valve and pipe nipple can be used.

On the end 206 of the pipe nipple 204 is a fitting 208. The fitting 208 is an opposing fitting of an open bottom end 101 of the plug 102 (male/female). For example, as illustrated in the figures, the fitting 208 can be a cam lock fitting and the plug 102 can be a camlock plug that can be received in the cam lock fitting and tightened into place. Other non-limiting options include a threaded steel plug, plastic plug or even rubber. In this application it is any plug or seal that secures to a pipe thread off a valve on the top of the tank.

Figure 5:
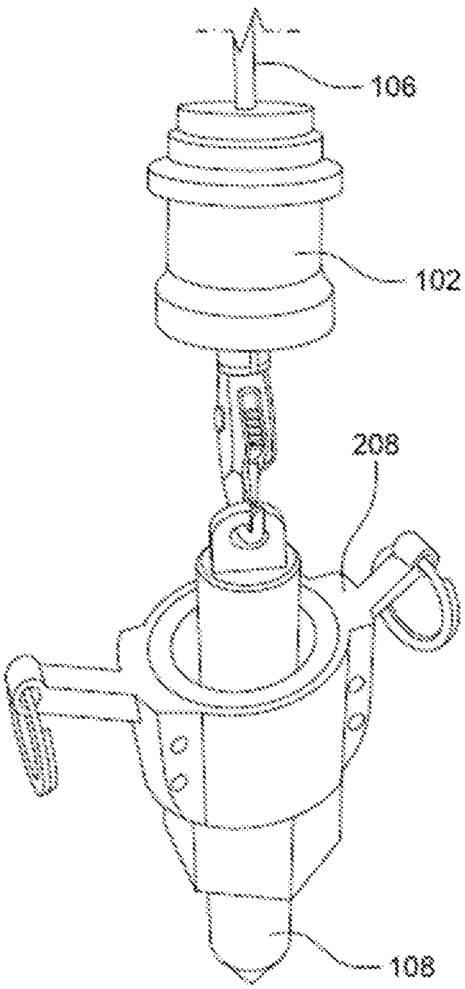
FIG. 5 is an illustration of the plumb bob being fed through the pipe nipple fitting.

When the storage tank 10 is not being gauged, the isolation valve 202 is closed. When the tank level is going to be measured, the plumb bob 108 is fed through the fitting 208 as illustrated in FIG. 5 and the plug 102 is secured with in the fitting 208. In FIG. 5, the fitting 208 is shown removed from the pipe nipple to better illustrate how the plumb bob 108 and gauge line 106 is fed through the fitting 208, pipe nipple 204 and into the storage tank 10. The isolation valve 202 is then opened and the gauge line 106 is fed through the slot 104 in the plug 102 until the plumb bob 108 is resting on the bottom of the tank. The gauge line 106 is then reeled back up through the slot 104, the operator looking for the liquid level. When the liquid level is seen, the measurement is taken. The remainder of the gauge line 106 is brought up until the plumb bob 108 is above the isolation valve 202. The isolation valve 202 is closed. The low emission tank gauge 100 can be left in place or can be removed by unsecuring the plug 102 from the fitting 208. This gauging is performed with very minimal emissions leakage. The plug reduces emissions and exposure to people preforming gauging duties. The use of the slot also works as a wiper to remove excessive amounts of liquid from the gauge line as it is being pulled from the tank.

Figure 6:
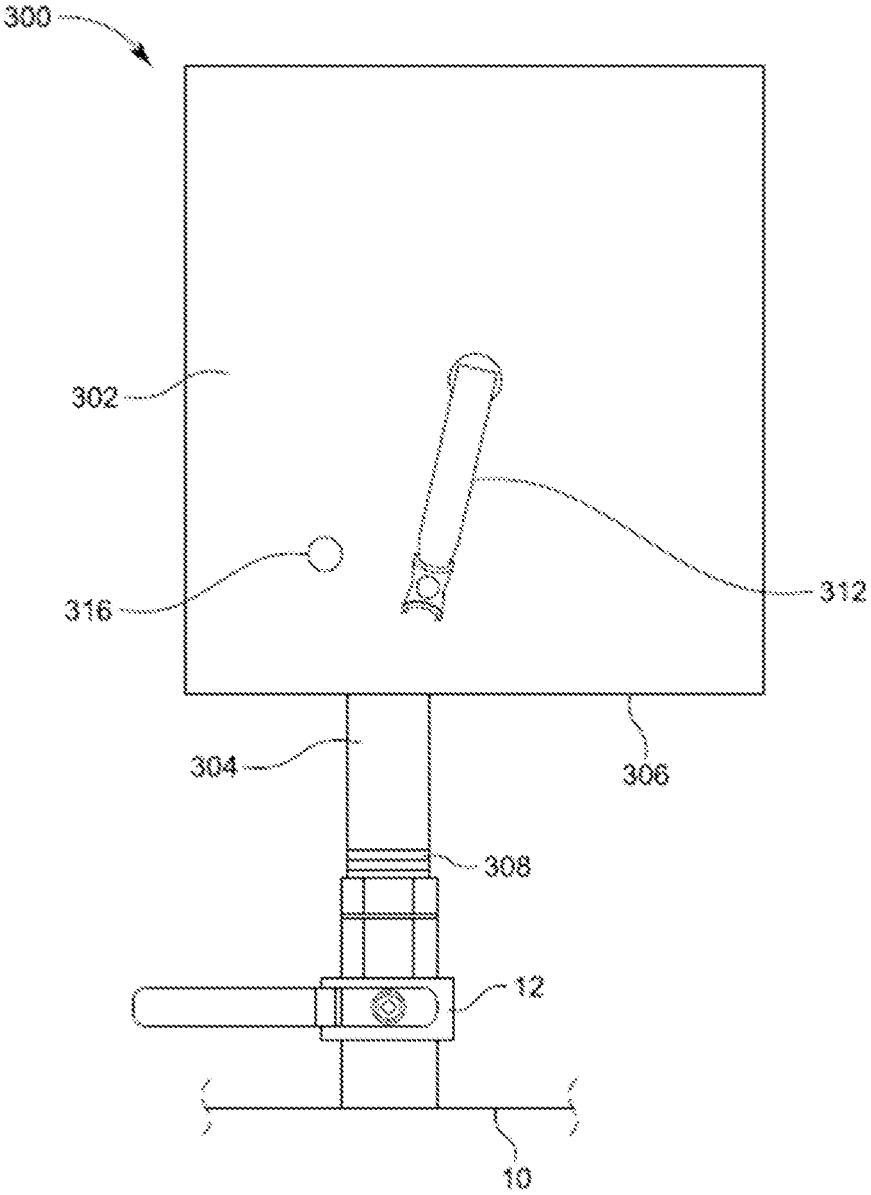
FIG. 6 is a schematic of a no emission tank gauge system.
Figure 7:
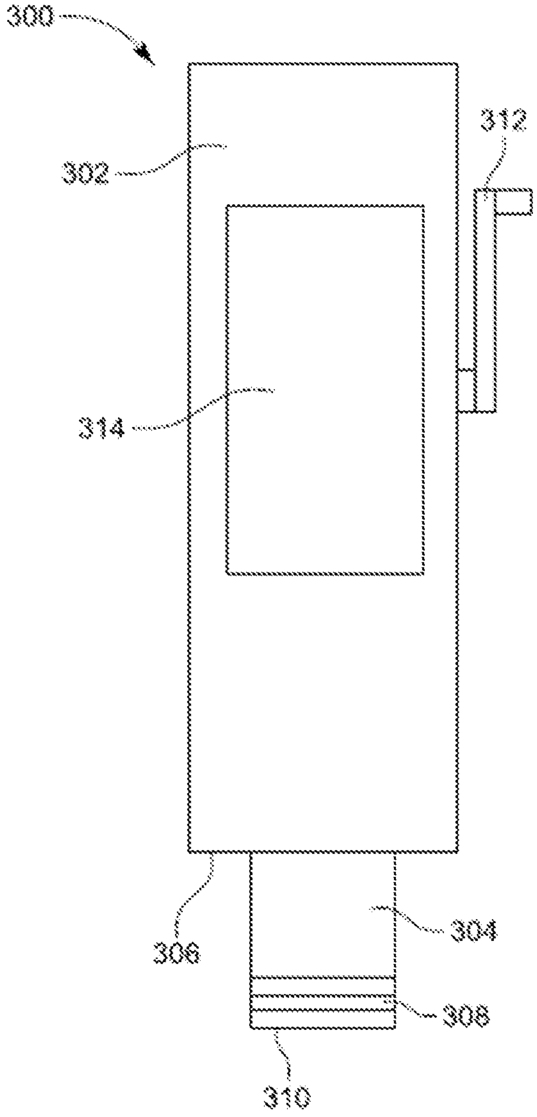
FIG. 7 is a view of the no emission tank gauge system of FIG. 6 showing the window.

Implementations of a no emission tank gauge system are described with respect to FIGS. 6-18. The components of FIGS. 6-18 may be similar to each other. As shown in FIGS. 6 and 7, a no emission tank gauge system 300 has a housing 302 configured to connect with an upper surface of the storage tank with a valve connection 304 extending from a bottom side 306 of the housing 302. The valve connection 304 can be a pipe nipple as illustrated, with threads 308 on a distal end 310 of the pipe nipple. Other valve connections known to those skilled in the art are contemplated so long as the valve connection sealingly connects to the valve. The housing 302 also has an actuator 312, the function of which is described below. The housing 302 also has a window 314 to see within the housing 302.

In FIG. 6, the valve connection 304 is illustrated connected to a valve 12 on the top of the storage tank 10. The no emission tank gauge system 300 is attached to the valve 12 when the valve is closed. The no emission tank gauge system 300 can be left in place, such as dedicated to the particular storage tank 10, with the valve 12 opened when the tank level is to be measured and closed after measurement is completed. Alternatively, the no emission tank gauge system 300 can be portable to use on any number of tanks, with the no emission tank gauge system 300 attached to the valve 12 when the valve is closed, the valve then opened to measure the storage tank level and re-closed after measurement is completed. The no emission tank gauge system 300 is then removed from the valve 12 for use with another storage tank.

Figure 8:
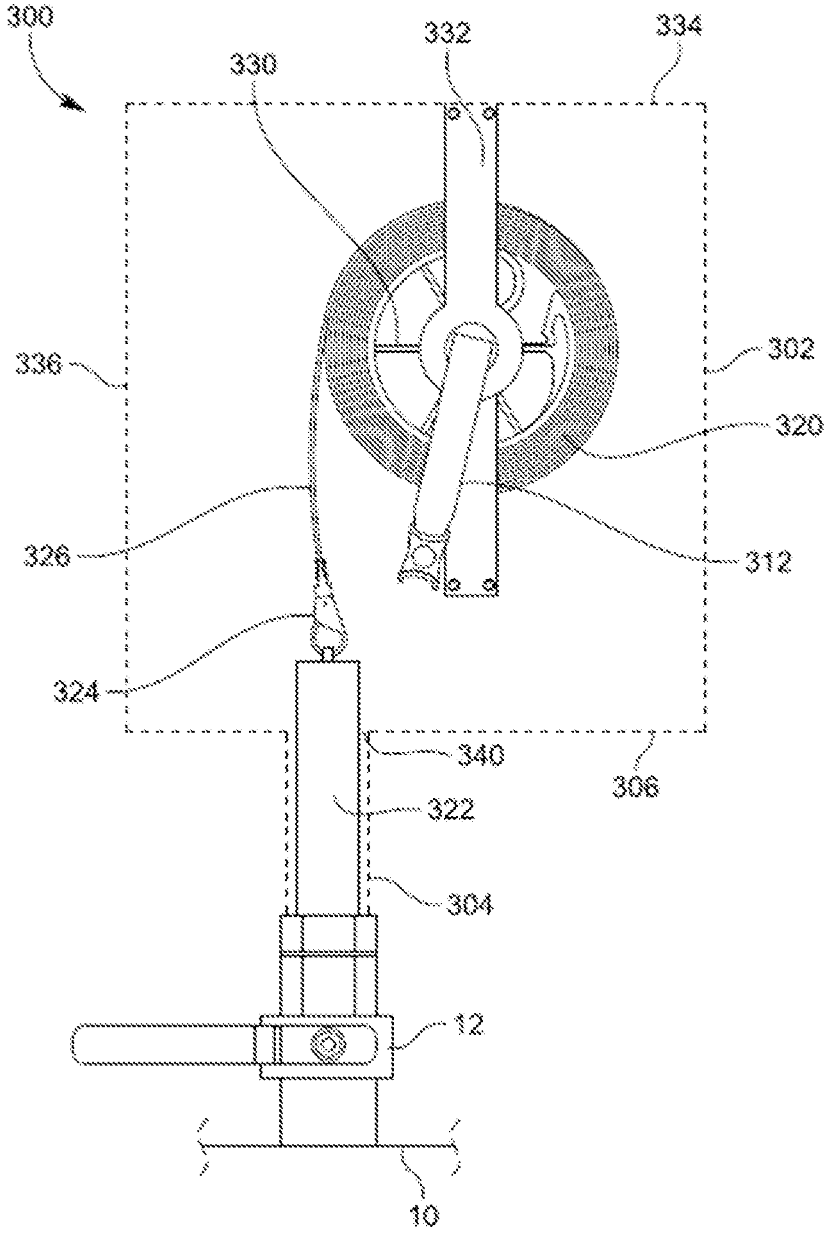
FIG. 8 is a schematic of the no emission tank gauge system with the housing and valve connection in broken line to show the internals of the housing.
Figure 9:
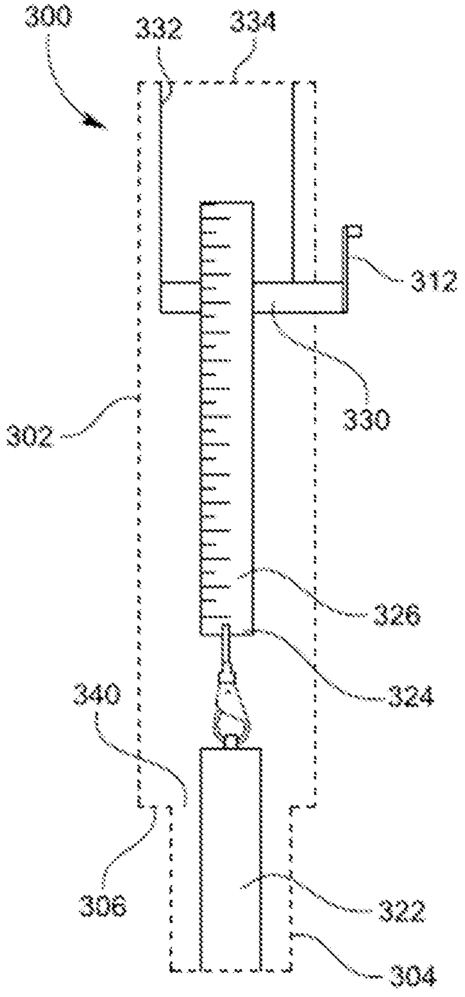
FIG. 9 is a view of the no emission tank gauge system of FIG. 8 from a side with the window.

FIGS. 8 and 9 illustrate the no emission tank gauge system 300 with the housing 302 and valve connection 304 in broken line to show the internal mechanisms within the housing 302. Within the housing 302 is a gauge line 320, the gauge line 320 having a plumb bob 322 attached at a free end 324 of the gauge line 320. The plumb bob is illustrated in FIGS. 8 and 9 as either extending into the valve 12 or being retracted from the valve 12. The plumb bob 322 can be the same as plumb bob 108 shown in FIG. 1. The gauge line 320 is a line or tape having at least one marked side 326 with a means for reading a measurement value. A pulley 330 is disposed or enclosed within the housing 302 to support the gauge line 320. A housing attachment portion 332 of the pulley 330 is illustrated attached to a ceiling wall 334 of the housing 302 for illustration, but can be attached to a different wall so long as the plumb bob 322 and free end 324 of the gauge line 320 are aligned above the valve connection 12. The pulley 330 is configured to allow extension and retraction of the spooled gauge line 320. To ensure that the gauge line 320 is aligned with the opening 340 of the valve connection 304, the plumb bob 322 can be positioned with its tip inside the valve connection 304 to an extent so that it does not extend below the distal end 310 of the valve connection 304. The plumb bob 322 is weighted to keep the gauge line 320 taut.

The actuator 312 is connected to the pulley 330 and extends exterior to the housing 302 as illustrated in FIGS. 6 and 7. The actuator 312 is configured to actuate the extension and retraction of the gauge line 320 via rotation of the pulley 330. The actuator 312 can be a rotatable handle configured to manually rotate the pulley. The actuator 312 may also include a release 316, that may be part of the actuator 312 or a separate actuator, configured to automatically retract the gauge line 320 rather than manually retracting the gauge line 320. The release 316 could be attached to a spring within the housing 302. When the gauge line 320 is extended, the spring extends, and when the release 316 is pressed, the spring retracts to its original position, retracting the gauge line 320.

The window 314 in the housing 302 is in a wall 336 of the housing 302 that faces the marked side 326 of the gauge line 320. The valve connection 304 has an opening 340 sized to allow for passage of the plumb bob 322 and the gauge line 320. The housing 302 is sealed when the valve connection 304 is connected to the valve 12, preventing escape of any emissions, such as vapors and gasses, that would release to atmosphere when the valve 12 is opened.

In use, the no emission tank gauge system 300 is attached to the valve 12 on the storage tank 10 via the valve connection 304. The valve 12 is opened. The gauge line 320 is extended by rotating the pulley 330 in a first direction with the actuator 312. The weighted plumb bob 322 will assist in directing the gauge line 320 through the valve connection 304 and opened valve 12 and into the storage tank 10. The gauge line 320 is extended until the plumb bob 322 contacts the bottom surface of the storage tank 10. At that time, the gauge line 320 can be manually retracted with the actuator 312 in a second direction, with the operator viewing the retracting gauge line 320 through the window 314 of the housing 302. When the operator sees the liquid line on the marked side 326 of the gauge line 320, the tank level is read and recorded. The remaining of the gauge line 320 can be fully retracted using the actuator 312 manually or using the release 316. The valve 12 is closed once the plumb bob 322 is above the valve 12. The no emission tank gauge system 300 can be left in place for the next tank level reading or can be removed via the valve connection 304 to be used elsewhere.

Figure 10:
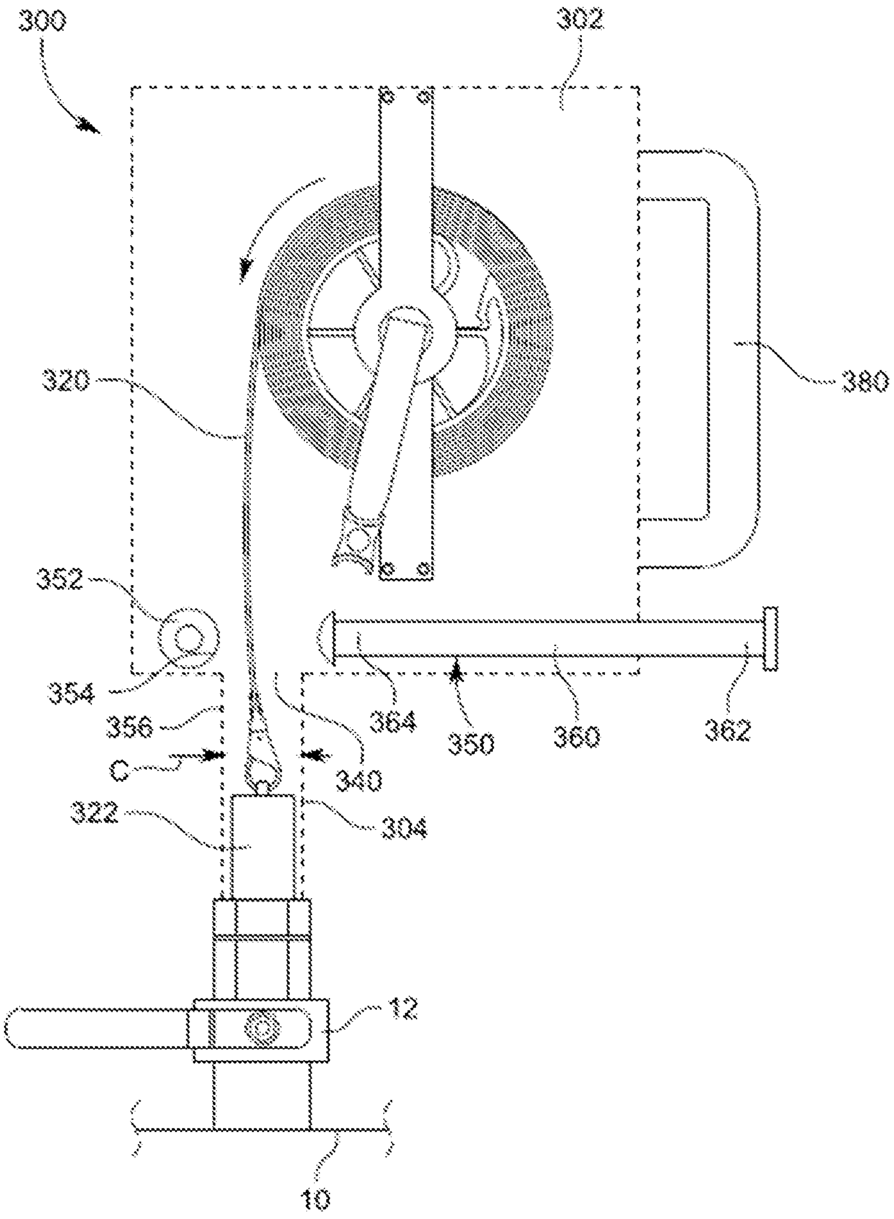
FIG. 10 is a schematic of the no emission tank gauge system with the housing and valve connection in broken line to show the internals of the housing, the internals including an optional gauge line liquid remover in an at-rest, open position.
Figure 11:
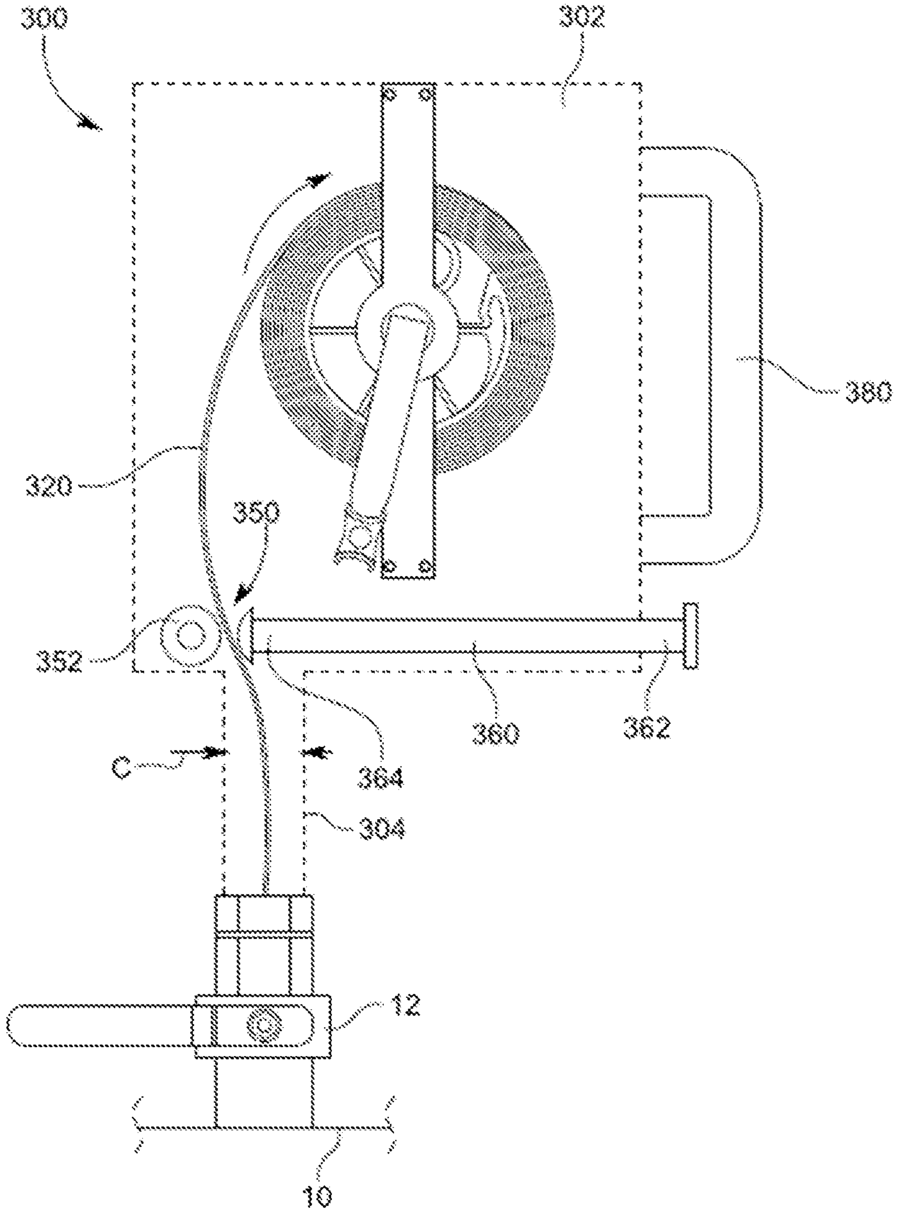
FIG. 11 is a schematic of the no emission tank gauge system with the housing and valve connection in broken line to show the internals of the housing, the internals including the optional gauge line liquid remover in an activated position.

FIGS. 10 and 11 illustrate an optional aspect of the no emission tank gauge system 300, the system 300 further including a gauge line liquid remover 350. The gauge line liquid remover 350 is configured to have an at-rest, open position to allow the plumb bob 322 and gauge line 320 to pass through the valve connection 304 without obstruction either during retraction or extension. The gauge line liquid remover 350 also has an activated position in which the gauge line liquid remover 350 contacts the gauge line 320 to remove liquid after tank level measurement, the removal occurring as the gauge line 320 is being retracted. So that the tank level can be read, the gauge line liquid remover 350 is not activated until the liquid level measurement is read through the window. After which, the gauge line 320 can be extended such that the liquid level line is in the valve connection 304. The gauge line liquid remover 350 can then be activated and the gauge line retracted fully. The gauge line liquid remover 350 cleans the gauge line, removing the liquid so that subsequent measurements are not negatively affected. Once the plumb bob 322 contacts the gauge line liquid remover 350, the gauge line liquid remover 350 can be deactivated into the at-rest, open position.

The gauge line liquid remover 350 has a cleaning member 352 attached within the housing 302 such that a surface 354 of the cleaning member 352 aligns with a first side 356 of the opening 340 of the valve connection 304. A plunger 360 is movably attached within the housing 302 and has a first end 362 positioned external to the housing 302 and a second end 364 within the housing 302. The plunger 360 has a first position shown in FIG. 10 in which the second end 364 is not within a circumference C of the opening 340 of the valve connection 304 and a second position, shown in FIG. 11, in which the second end 364 is within the circumference C of the opening 340 of the valve connection 304. The plunger 360 is configured to be manually moved between the first position and the second position via the first end 362. One or both of the cleaning member 352 and the second end 364 of the plunger 360 may be made of a sponge-like material to assist in frictionally contacting the gauge line 320 and removing the liquid. The cleaning member 352 may be a roller as illustrated, attached to the housing but configured to roll as the gauge line 320 moved past it, the roller removing the liquid on the marked side 326 of the gauge line 320. The cleaning member 352 can be other than a roller, such as a wiper blade of a flexible material. The second end 364 of the plunger 360 may be shaped in an arc to represent a roller or may be a wiper of a somewhat flexible material so that it can remove the liquid from the gauge line. The plunger 360 is provided by way of example. The plunger 360 may be more than one piece or extend from a different wall of the housing, so long as the plunger is configured to move the gauge line 320 so that it is contact with the cleaning member 352.

FIGS. 10 and 11 also illustrate another optional aspect of the no emission tank gauge system 300, the system 300 further including a fixed handle 380 attached to an external wall of the housing 302. For example, the fixed handle 380 can be attached to a wall as illustrated in the figures. Alternatively, the fixed handle 380 can be attached to the wall opposite the wall through which the actuator 312 extends, so that an operator can hold the fixed handle while turning the actuator 312 and looking through the window 314.

Figure 12:
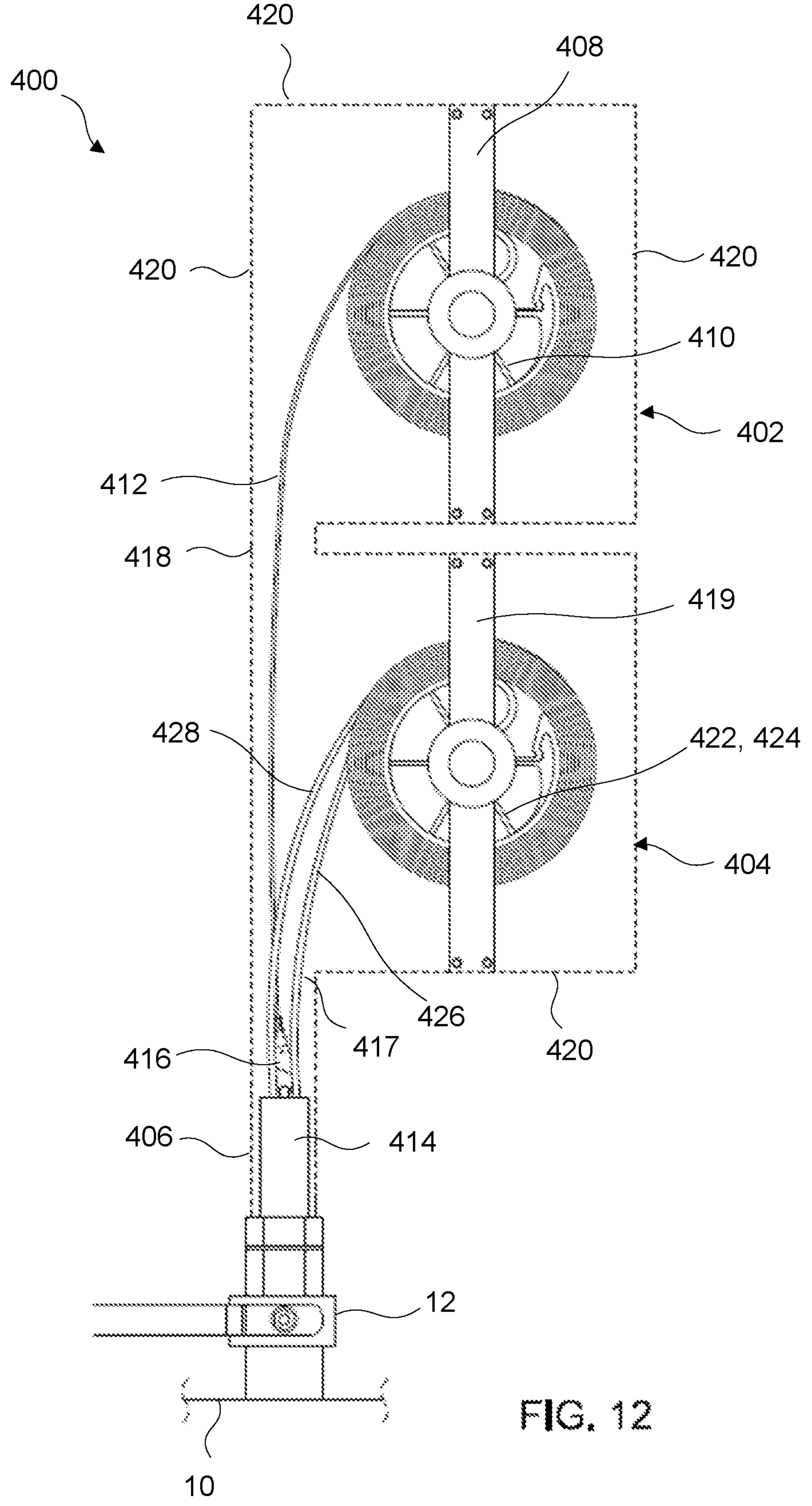
FIG. 12 is a schematic of the no emission tank gauge system with the first and second housings and valve connection in broken line to show the internals of the first and second housings.
Figure 13:
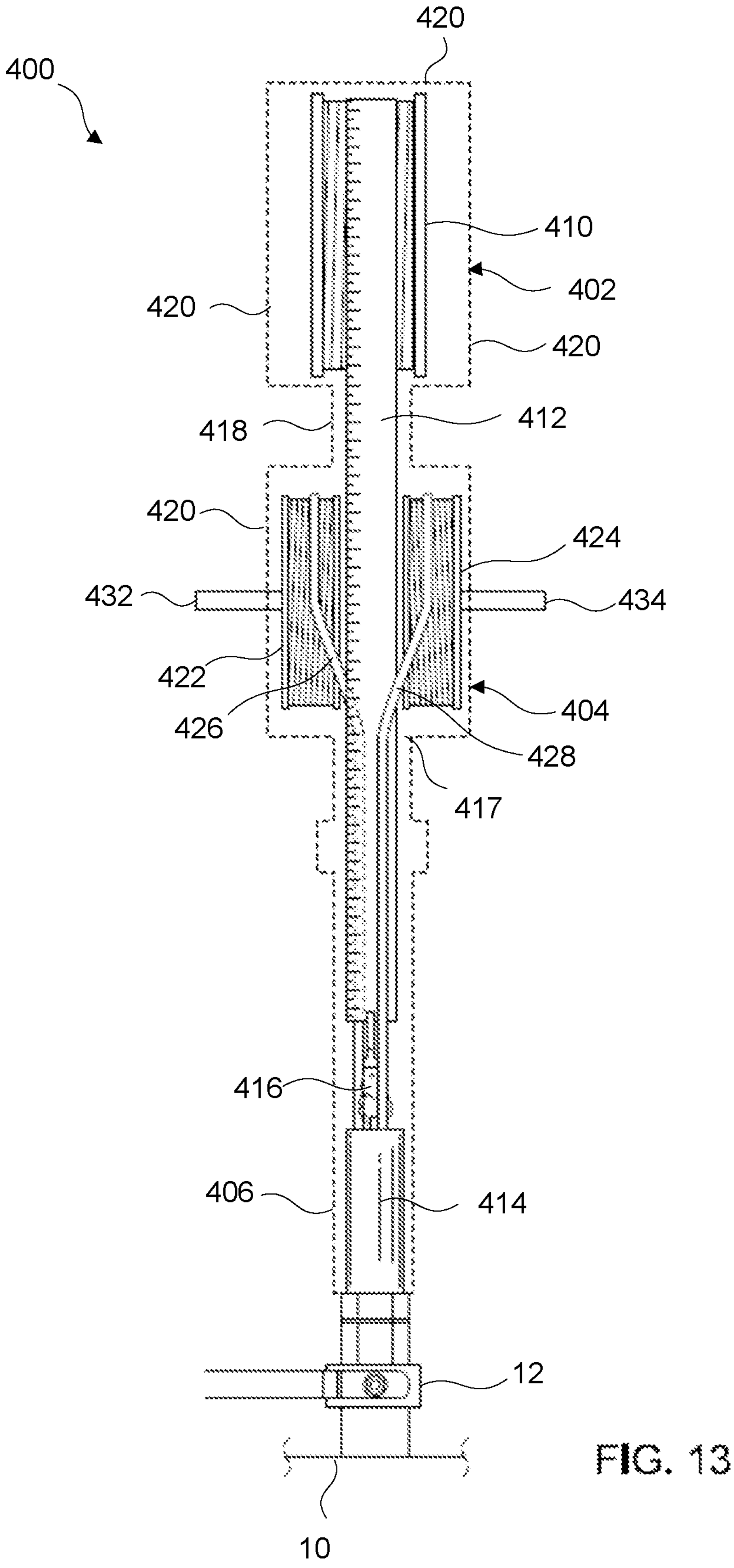
FIG. 13 is a schematic of the no emission tank gauge system with the first and second housings and valve connection in broken line to show the internals of the first and second housings.

FIGS. 12-13 are schematics of the no emission tank gauge system 400 with the first and second housings 402, 404 and valve connection 406 in broken line to show the internals enclosed of the first and second housings 402, 404. The first and second housings 402, 404 may be referred to as different chambers. The first and second housings 402, 404 connect with an upper surface of the storage tank 10 through a valve connection 406 that extends between the second housing 404 and the valve 12 so that the first and second housings 402, 404 are in closable fluid communication with the with storage tank 10. A first housing attachment portion 408 (which may be configured as one or more actuators that control rotation of the first pulley 410) connects a first pulley 410 disposed in the first housing 402 so that the gauge line 412 can be tautly spooled and unspooled as the plumb bob 414 at a free end 416 of the gauge line 412 is lowered into the storage tank 10.

Between the first and second housings 402, 404, a housing channel 418 provides a pathway for the gauge line 412 to move between the first and second housings 402, 404, through an opening 417, and to the storage tank 10. The opening 417 may have a size sufficient to allow the plumb bob 414 and any additional components (e.g., a blower or other sampling device) from the first and/or second housings 402, 404 to the storage tank 10. In some examples, the opening 417 may include an additional valve (not shown) to allow for regulation of fluids and the gauge line 412 from the second housing 404 and the storage tank 10.

Each of the first and second housings 402, 404 are surrounded by walls 420 that are configured separate the internal components from the external environment. The walls 420 form an airtight seal around the internal components and may optionally include transparent windows anywhere on the walls 420 that are configured to allow the user to observe internal components of the first and second housings 402, 404. For example, optional transparent walls may be useful to observe measurements or make them readable or viewable on the gauge line 412 or determine if one of the internal components are tangled on one of the pulleys (e.g., the first, second, and third pulleys 410, 422, 424).

In the second housing 404, a second housing attachment portion 419 (which may be configured as one or more actuators that control rotation of the second and third pulleys 422, 424) is included that is connected to second and third pulleys 422, 424. The second pulley 422 is connected with a tube 426 that is configured to capture fluids at the free end 416 and move the fluids out of the storage tank through the tube 426. On the third pulley 424, a wire 428 is included that is configured provide power to a tube 426, free end 416, and/or plumb bob 414. For example, the wire 428 may provide power to a blower, pump, sensor, and/or monitor (not shown) that is connected and/or integrated with the plumb bob 414.

The first, second, and third pulleys 410, 422, 424 may each be connected to the housing by an means sufficient to allow rotation, and each of the first, second, and third pulleys 410, 422, 424 may include unified or independent systems to control the rotation. For example, one or more of the first, second, and third pulleys 410, 422, 424 may include an automatic or electric actuator, a spring-loaded actuator, a magnetic actuator, a hand crank actuator, or any combination thereof. One or more of the rotation mechanisms may be used to control the speed, or unity of rotation between the first, second, and third pulleys 410, 422, 424 so that none of the gauge line 412, tube 426, and/or wire 428 become tangled or displaced during lowering or raising of the plumb bob 414.

As a pathway outside of the first and second housings 402, 404, first and second channels 432, 434 are included at the second housing 402 so that the tube 426 and the wire 428 respectively are connectable to devices or power sources outside of the second housing 404. For example, the wire 428 may connect with a power source (not shown) through the second channel 434 configured to provide energy to a device within the no emission tank gauge system 500. In another example, the tube 426 may connect with a sampling or analytical device configured to check fluids or other samples through the first channel 432 so that a user can determine the concentration or presence of compounds in the storage tank 10.

Figure 14:
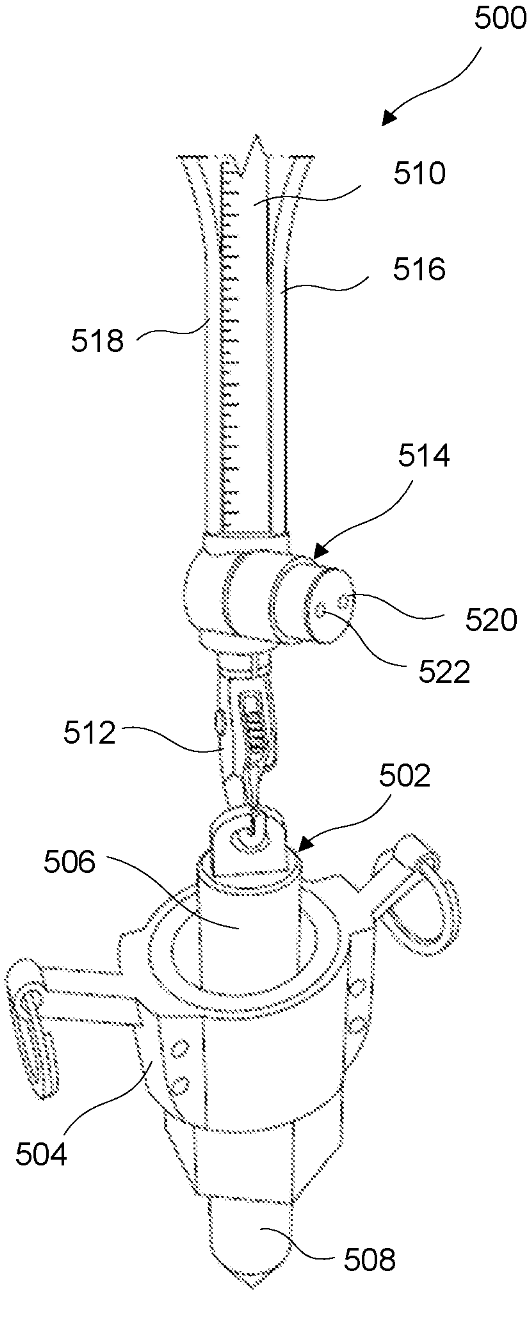
FIG. 14 is an illustration of the plumb bob being fed through the pipe nipple fitting.

FIG. 14 is an illustration of the no emission tank gauge system 500 (housing(s) not shown) having a plumb bob 502 being fed through the pipe nipple fitting 504. The plumb bob 502 has top and bottom portions 506, 508 that have a substantially contiguous cross section and are configured to move through the pipe nipple fitting 504 so that the user can determine the fluid or sample levels in the storage tank (not shown) by reading measurements on the gauge line 510.

Between the gauge line 510 and an end fitting 512 of the plumb bob 502, a pump 514 (also referred to as a sampling device) is included that is configured to extract fluids (i.e., liquids or gases) from the storage tank (not shown) at a given level as determined by the position of the plumb bob 502. The combination of the gauge line 510 and the plumb bob 502 is useful to determine where pump 514 is positioned within the storage tank (not shown) so that a sample at a desired level can be analyzed. For example, the user may lower the plumb bob 502 into the storage tank (not shown), determine the position of the plumb bob 502 and/or pump 514 via measurements on the gauge line 510, and extract a sample using the pump 514 at a desired level. Attached or adjacent to gauge line 510, a tube 516 provides a pathway to extract samples (which may be liquid or gaseous) from the storage tank (not shown) and through the pump 514 to an analytical, storage, or another sampling device configured to identify, transmit, transport, or store samples. The pump 514 may also be configured as a blower that is configured to extract volatiles from the storage tank (not shown) and through the tube 516.

To provide power or data transmission capability, a wire 518 connects to the pump 514. The pump 514 may be configured to extract and analyze samples, and data information may be transmitted through the wire 518 to an external transmission device configured to alert a user of the conditions or compounds within the storage tank (not shown). For example, the user may be alerted by the presence of moisture of water within the storage tank (not shown). In some examples, the wire 518 is not present where a battery (not shown) is integrated with the pump 514. In other examples, the wire 518 may be replaced by or integrated with another tube configured to recycle samples extracted through the tube 516 back into the storage tank (not shown).

To facilitate extraction and recycle samples, the pump 514 includes extraction and recycle openings 520, 522 configured to move samples out of and back into the storage tank (not shown). The configuration of having separate extraction and recycle openings 520, 522 may be advantageous to avoid contamination between extracted and unextracted samples during continuous sample. In other examples, the extraction and recycle openings 520, 522 are not separated and are a single opening configured to both extract and recycle samples, which may be advantageous to be able to extract and then flush a single opening.

Figure 15:
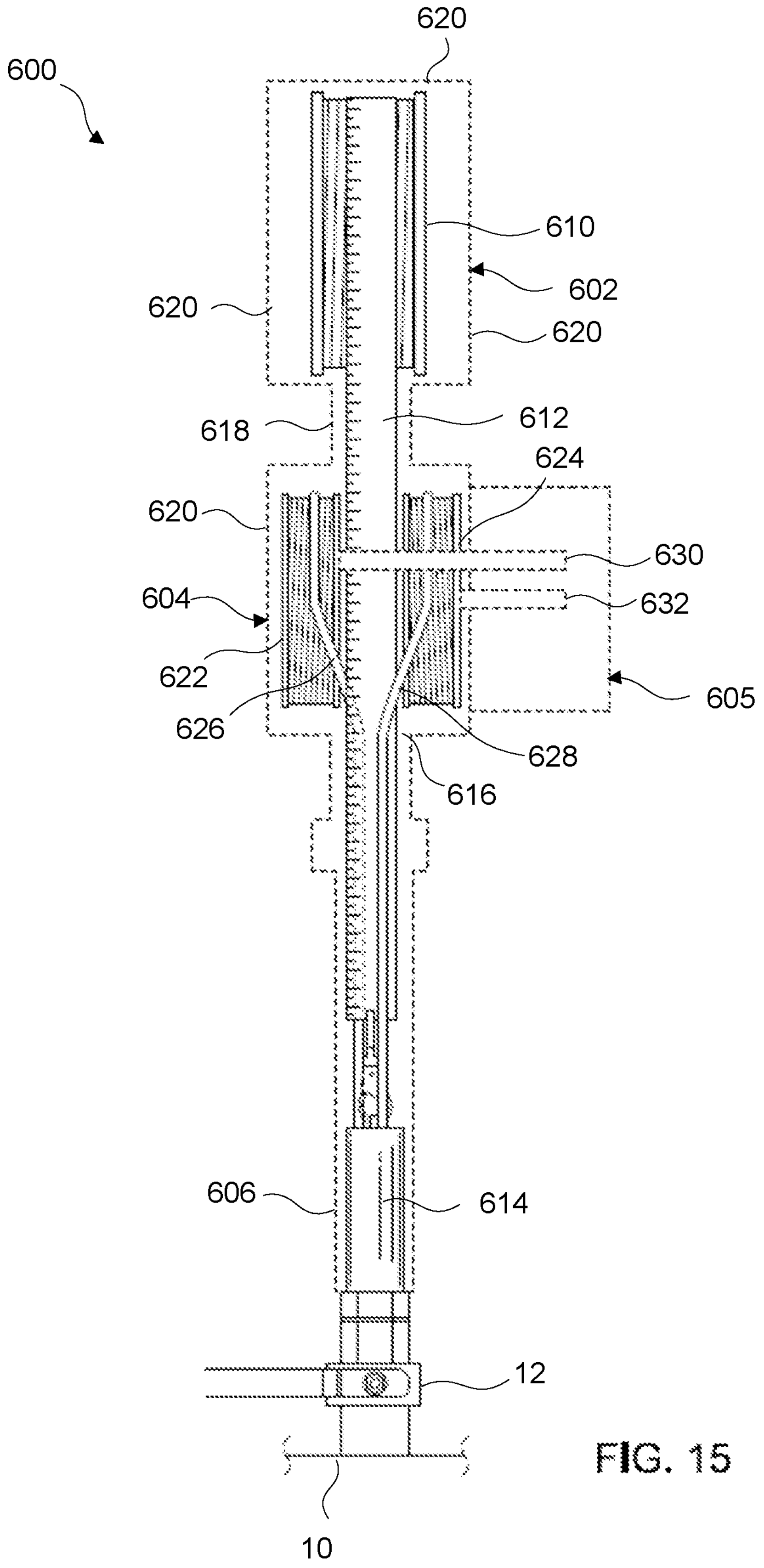
FIG. 15 is a schematic of the no emission tank gauge system with the first and second housings and an auxiliary housing and valve connection in broken line to show the internals of the first, second, and auxiliary housings.

FIG. 15 is a schematic of the no emission tank gauge system 600 with the first and second housings 602, 604 and an auxiliary housing 605 and valve connection 606 in broken line to show the internals of the first, second, and auxiliary housings 602, 604, 605. The first housing includes a first pulley 610 that includes a gauge line 612 connected with a plumb bob 614, and the plumb bob 614 is configured to move into and out of the storage tank 10 by lowering the gauge line 612 through an opening 616 of the valve connection 606 that leads to the valve 12.

A housing channel 618 is configured to connect the first and second housings 602, 604 defined by walls 620. Within the second housing 604, first and second pulleys 622, 624 respectively include a tube 626 and a wire 628 that are each coiled around the respective first and second pulleys 622, 624 and configured to simultaneously lower into the storage tank 10 as the plumb bob 614 is lowered into the storage tank 10 by the gauge line 612. The tube 626 and the wire 628 are each connected with the plumb bob 614 or gauge line 612 and may be integrated with a blower, pump, sampling device, or a combination thereof that is integrated proximate to or connected with either of the plumb bob 614 or gauge line 612.

The auxiliary housing 605 connects with the second housing 604 via first and second channels 630, 632 and functions to provide a separate structure to house pumping or blowing devices, analytical instruments, a power source, and/or a transmission device (not shown). The pumping or blowing devices (not shown) may be used with or independently of a blower or pump (not shown) that is attached to the gauge line 612 or the plumb bob 614 to move fluid samples out of and back into the storage tank 10. The analytical instruments (not shown) may function to detect which compounds are present and at which particular concentration within the storage tank 10 so that the user can monitor conditions within the storage tank 10 without having to open the storage tank 10 to take a sample. The power source (not shown) may provide energy to electrical devices associated with the gauge line 612, the plumb bob 614, and/or the auxiliary housing 605, such as the analytical instruments, pumping or blowing devices, and/or transmission devices. The power source (not shown) may be a battery or a plug that receives energy from an external power source. The transmission device (not shown) may be used to alert a user of the conditions within the storage tank 10 via a Bluetooth, satellite, WiFi, and/or cellular connection. In some examples, the auxiliary housing 605 serves as a means to extract samples, which are analyzed by an external analytical device. In some examples, the auxiliary housing 605 includes a storage container that functions to store samples take at a certain time of day for later testing by an external device.

In some examples, the auxiliary housing 605 is directly affixed to the first and/or second housings 602, 604 to maintain a sturdy and compact configuration. In other examples, first and second channels 630, 632 extend through open space between the auxiliary housing 605 and the first and/or second housings 602, 604. In some examples, only one channel (not shown) connects the tube 626 and the wire 628 with the auxiliary housing 605. For example, where a tube and wire (not shown) are integrated into a single pathway and coiled around a single pulley (not shown), one channel may be used to connect the wire and tube with the auxiliary housing 605.

Figure 16:
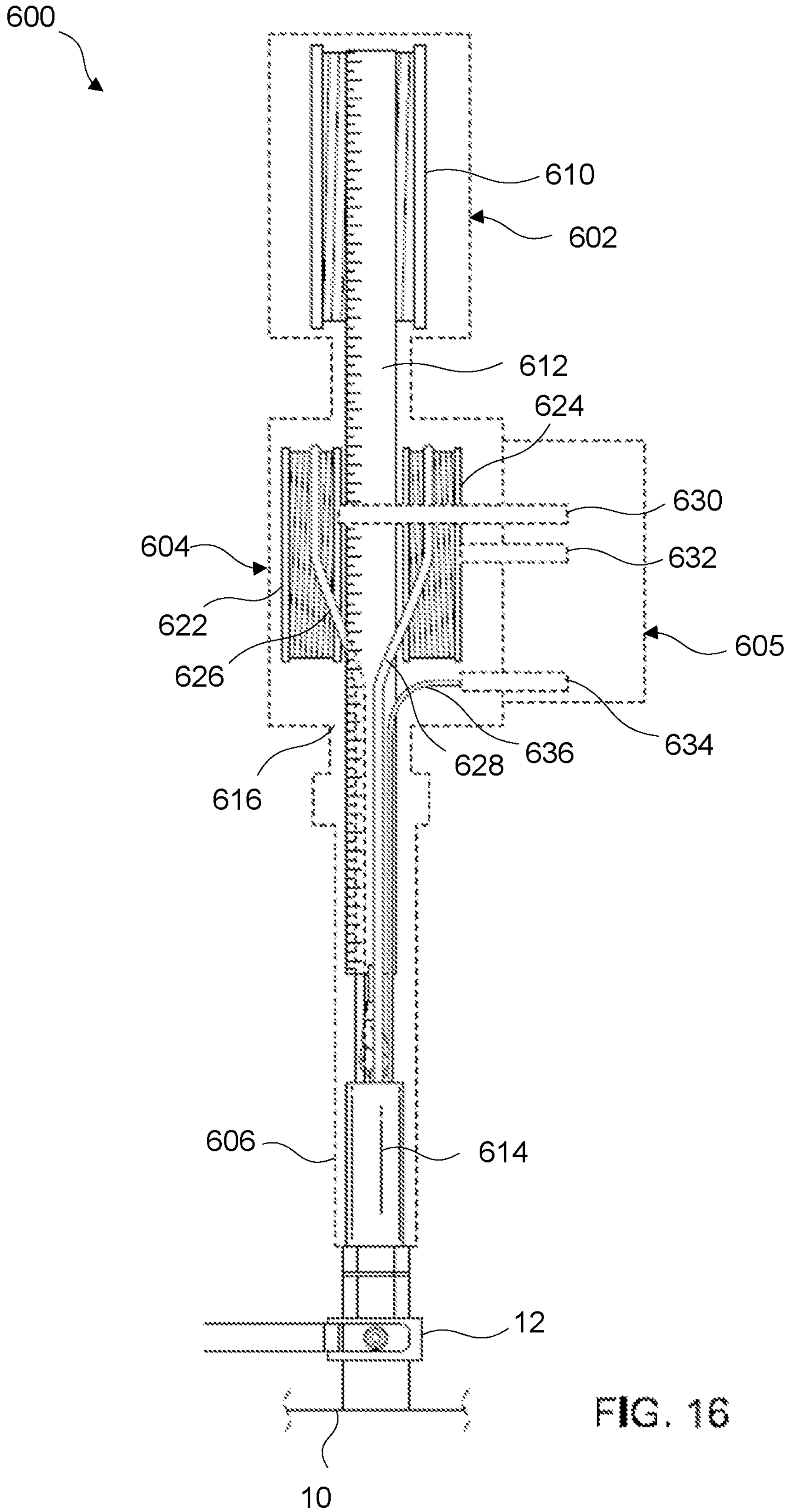
FIG. 16 is a schematic of the no emission tank gauge system with the first and second housings and an auxiliary housing and valve connection in broken line to show the internals of the first, second, and auxiliary housings.

FIG. 16 is another schematic of the no emission tank gauge system 600 with the first and second housings 602, 604 and an auxiliary housing 605 and valve connection 606 in broken line to show the internals of the first, second, and auxiliary housings 602, 604, 605 that additionally includes a return channel and tube 634, 636.

The return channel and tube 634, 636 function to move extracted samples within the auxiliary housing 605 back into the storage tank 10. This may be additionally useful to avoid sending extracted samples back down the tube 626, which may contaminate the tube 626 when the plumb bob 614 is lowered or raised and a sample is extracted at a different level within the storage tank 10. Additionally, the return channel and tube 634, 636 may be utilized to provide an additive to the storage tank 10, such as a moisture absorbent. In some examples, the return tube 636 may be integrated with one or both of the tube 626 and/or the wire 628. The return tube 636 may be coiled around another pulley (not shown) within either the second housing 604 or the auxiliary housing 605.

Figure 17:
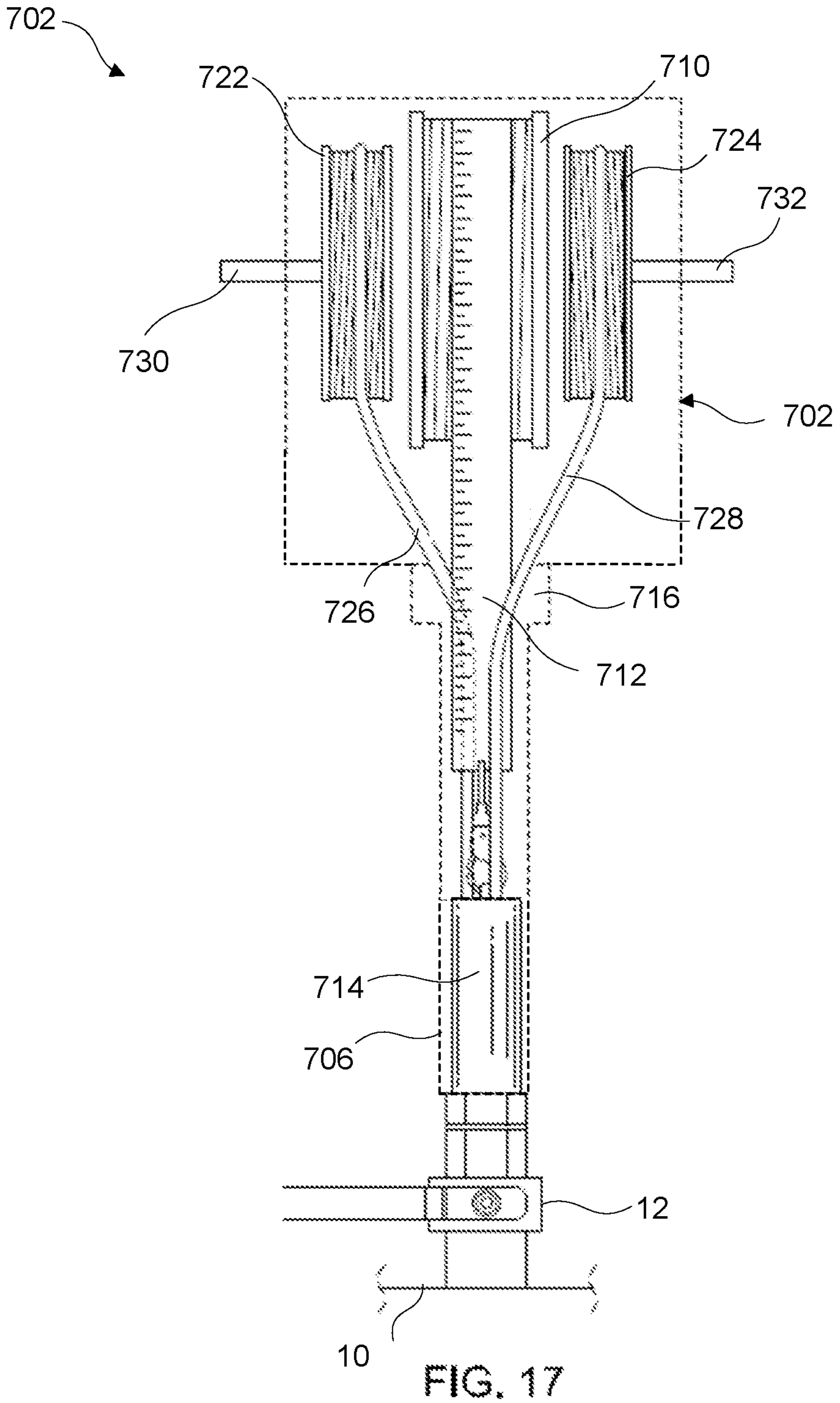
FIG. 17 is a schematic of the no emission tank gauge system with the housing and valve connection in broken line to show the internals of the housing.
Figure 18:
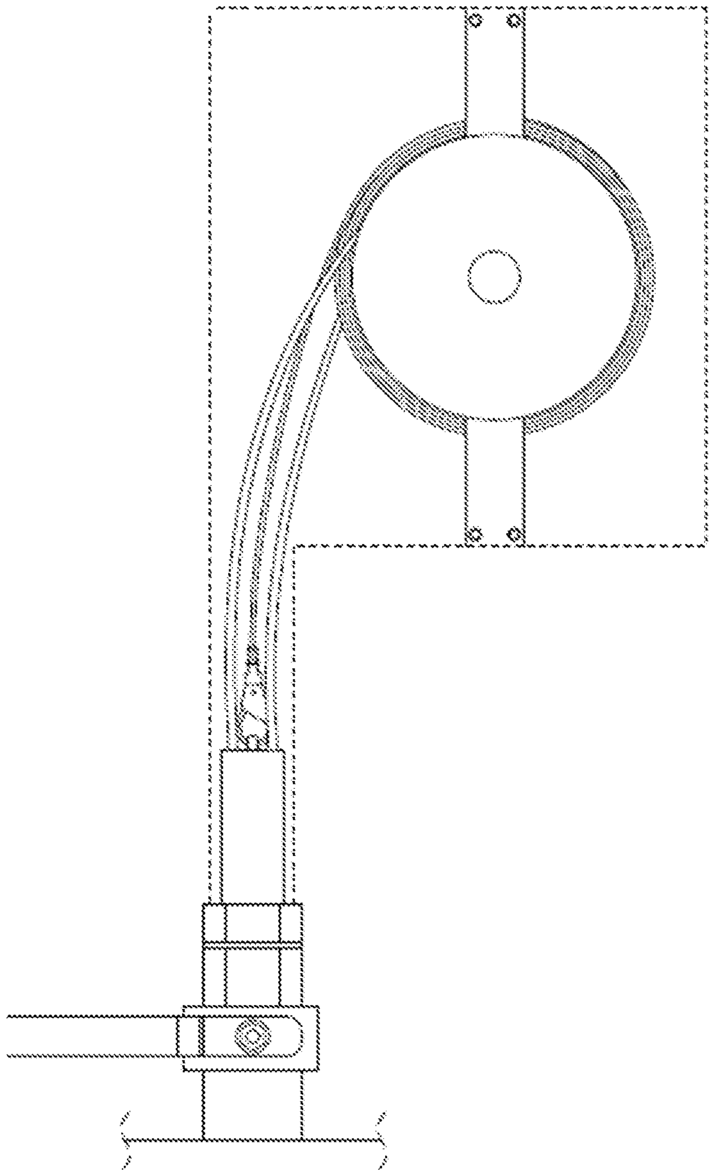
FIG. 18 is a schematic of the no emission tank gauge system with the housing and valve connection in broken line to show the internals of the housing.

FIGS. 17-18 are schematics of the no emission tank gauge system 700 with the housing 702 and valve connection 706 in broken line to show the internals of the housing 702. The gauge pulley 710 of the housing 702 includes a gauge line 712, which may be optionally visible through a transparent wall (not shown) of the housing, to lower and raise the plumb bob 714 through an opening 716 within the storage tank 10 for determining how full the storage tank 10 is or to take a sample at a location of the plumb bob 714.

On one side of the gauge pulley 710 a tube pulley 722 includes a tube 726, and on the other side of the gauge pulley 710, a wire pulley 724 includes a wire 728. The gauge, tube, and wire pulleys 710, 722, 724 are connected to the housing 702 by any means sufficient to have rotatability and may have the same or different rotation systems that are configured to rotate such that none of the wire 728, the gauge line 712, and/or tube 726 become tangled or displaced during raising and/or lowering of the plumb bob 714. In some examples, the gauge, tube, and wire pulleys 710, 722, 724 are arranged as a single pulley (not shown), and/or the gauge line 712, tube 726, and/or wire 728 may be integrated onto a single pulley (not shown) so that coiling an uncoiling.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A no emission tank gauge, comprising:

a. a housing configured to connect with an upper surface of a storage tank at a valve connection;

b. a pulley system disposed within the housing, comprising:

i. gauge line;

ii. a plumb bob connected with a distal end of the gauge line; and iii. a sampling tube connected with the gauge line and configured to move with the gauge line as the plumb bob is lowered into the storage tank; and c. a sampling device configured to remove a fluid sample from the storage tank through the sampling tube wherein the gauge line and the sampling tube are positioned on a first pulley and a second pulley, respectively, and the first pulley comprises an actuator configured to move the gauge line into the storage tank, and wherein the second pulley is spring-loaded so that the sample tube remains taut as the actuator rotates the first pulley and simultaneously moves the gauge line and the sampling tube into the storage tank.

2. The no emission tank gauge of claim 1, wherein the sampling device is positioned outside of the housing and is connected with the storage tank through the sampling tube.

3. The no emission tank gauge of claim 1, wherein the sample device comprises:

a. a blower and/or a pump; and b. an analytical instrument connected with the blower and/or the pump and connected with the storage tank through the sampling tube, the analytical instrument configured to analyze the fluid sample.

4. The no emission tank gauge of claim 1, further comprising:

a. a transparent window defined within a wall of the housing so that the gauge line is observed through the transparent window.

5. The no emission tank gauge of claim 1, wherein the gauge line and the sampling tube are positioned on a single pulley.

6. The no emission tank gauge of claim 1, wherein the sampling device is enclosed by the housing.

7. The no emission tank gauge of claim 6, wherein the sampling device is connected with the gauge line at a position proximate to the plumb bob so that the sampling device moves with the plumb bob.

8. A no emission tank gauge, comprising:

a. a housing that is sealed and comprises a valve connection that is configured to connect with a storage tank;

b. a first pulley comprising a gauge line and a plumb bob connected with the gauge line at a distal end of the gauge line, the plumb bob configured to be lowered into the storage tank through the connection valve;

c. a second pulley comprising a sampling tube that is spooled around the second pulley and connected with the distal end of the gauge line or the plumb bob; and d. a third pulley comprising a sampling device connected with a distal end of the sampling tube and a wire spooled around the third pulley, wherein the wire connects the sampling device and a power source.

9. The no emission tank gauge of claim 8, wherein the second and third pulleys are spring-loaded so that the wire and the sampling tube are taut with the gauge line as the plumb bob moves through the storage tank.

10. The no emission tank gauge of claim 8, wherein the housing comprises:

a. a first chamber that encloses the first pulley;

b. a second chamber that encloses the second and third pulleys; and c. a channel that connects the first and second chambers.

11. The no emission tank gauge of claim 8, wherein the sampling tube is connected with an analytical device configured to analyze fluid samples with the storage tank.

12. The no emission tank gauge of claim 11, further comprising:

a. a recycle tube connected with the analytical device or the sample tube and configured to flush fluids from the sample tube and into the storage tank.

13. The no emission tank gauge of claim 8, further comprising:

a. a window defined on a wall of the housing so that the gauge line is observable within the housing.

14. The no emission tank gauge of claim 13, wherein the gauge line includes a marked side that is visible outside of the housing through the window.

* * * * *